(No Model.)

E. O. LOFDAHL.
COMBINED BIT AND SAW.

No. 505,712. Patented Sept. 26, 1893.

Witnesses:
J. R. Evans
E. Behel

Inventor:
Eric O. Lofdahl
By A. O. Behel
Atty.

UNITED STATES PATENT OFFICE.

ERIC O. LOFDAHL, OF ROCKFORD, ILLINOIS.

COMBINED BIT AND SAW.

SPECIFICATION forming part of Letters Patent No. 505,712, dated September 26, 1893.

Application filed December 29, 1892. Serial No. 456,722. (No model.)

*To all whom it may concern:*

Be it known that I, ERIC O. LOFDAHL, a citizen of the United States, residing in Rockford, in the county of Winnebago and State of Illinois, have invented a certain new and useful Combined Bit and Saw, of which the following is a specification.

The object of this invention is to form the shank portion of the bit with saw teeth, in such a manner as to embody a combined bit and saw in a single article.

Figure 1:
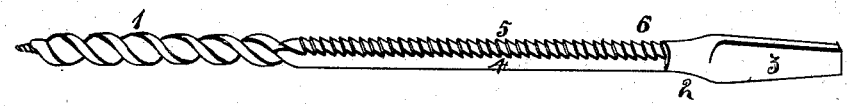
Figure 2:
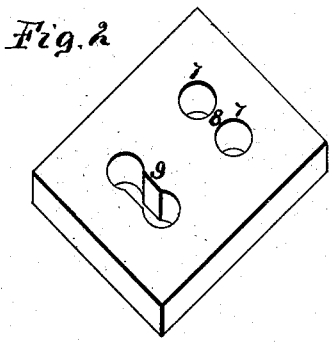

In the accompanying drawings, Figure 1 is an isometrical representation of my improved combined bit and saw. Fig. 2 is an isometrical representation of a section of wood, showing the kind of work which my improved combined bit and saw is especially adapted to perform.

The drill represented at Fig. 1 of the drawings consists of the twisted portion 1 and the shank portion 2, provided with a square end 3 to enter a brace, the shank portion in this instance having its opposite sides 4 and edge 6, flattened to a less diameter than the outside diameter of the twisted portion. Saw teeth 5, are filed or formed in the edge 6 in this instance nearly the length of the shank and of such depth and size to meet the requirements of the user. This construction of combined bit and saw is especially adapted for cutting key holes as shown at Fig. 2. In cutting key holes it is usual to bore two holes 7 and cut out the connecting web 8, with a chisel, which is a slow process.

By the use of my combined bit and saw the operator after boring the last hole moves the bit far enough through the hole to allow the saw portion to come in contact with the web and a back and forth movement of the brace carrying the combined bit and saw will very quickly remove the web when the key hole will appear clear as shown at 9. By making the sides and one edge flattened and of less diameter than the diameter of the bit portion, it will be evident that the saw may be placed and the sawing commence, at any point within the opening made by the bit.

I am aware that a saw having a gimlet point is old and therefore do not claim such construction.

I claim as my invention—

A key hole cutter consisting of a section in bit form, the shank being flattened on two opposite sides and one edge, and being of less diameter than the diameter of the bit portion, the edge being cut in saw teeth and the end of the shank fitted to enter a brace.

ERIC O. LOFDAHL.

Witnesses:
J. R. EVANS,
A. O. BEHEL.